United States Patent [19]

Adkins et al.

[11] Patent Number: 4,856,736

[45] Date of Patent: Aug. 15, 1989

[54] AIRCRAFT WITH PAIRED AEROFOILS

[75] Inventors: Gordon V. Adkins; John R. McDonald, both of Wimborne; Olav N. Sivertsen, Isswich, all of United Kingdom

[73] Assignee: Skywardens Limited, Dorset, United Kingdom

[21] Appl. No.: 211,754

[22] Filed: Jun. 27, 1988

[30] Foreign Application Priority Data

Jun. 26, 1987 [GB] United Kingdom ............... 8715073
Mar. 21, 1988 [GB] United Kingdom ............. 88006681

[51] Int. Cl.4 ...................... B64C 3/00; B64C 39/08
[52] U.S. Cl. ................................................ 244/45 R
[58] Field of Search .......................... 244/45 R, 46, 47

[56] References Cited

U.S. PATENT DOCUMENTS 2,406,625  8/1946  Oglesby ........................... 244/45 R
3,942,747  3/1976  Wolkovitch ..................... 244/45 R
4,235,400  11/1980 Haworth ........................... 244/45 R
4,438,760  3/1984  Radebold ......................... 244/45 R

FOREIGN PATENT DOCUMENTS 2555718  6/1977  Fed. Rep. of Germany .... 244/45 R
2579169  9/1986  France .............................. 244/48 R Primary Examiner—Joseph F. Peters, Jr.
Assistant Examiner—Rodney Corl
Attorney, Agent, or Firm—Reising, Ethington, Barnard, Perry & Milton

[57] ABSTRACT

An aircraft having paired aerofoils 12, 14 and 24, 26, the wing tips 16 and 18 being joined in the same plane one behind the other. The trailing edge of the forward wings and the leading edge of the rearward wings being substantially coincidental in plan view at the wing tip. The minimum angle between the wings 12 and 24 is 4 degrees at the tips of the wing. The substantial part of the forward wings is higher than the rearward wings.

9 Claims, 4 Drawing Sheets

AIRCRAFT WITH PAIRED AEROFOILS

The present invention relates to aircraft with paired aerofoils. In particular the present invention relates to lifting surfaces for fixed wing aircraft. However the paired aerofoils of the present invention may also be used in relation to propellers for aircraft, helicopter rotorblades, ship and boat hydrofoils as well as rotary mixing devices for the mixing of materials.

The concept of paired aerofoils for aircraft is well known. For example GB 2062565 shows an aircraft having a paired aerofoil in which one aerofoil has positive dihedral whereas the rear aerofoil has anhedral. The aerofoils have their extended planes intersecting and joined at the line of intersection by a tubular member. In this instance the front wing is below the rear wing and the wings are not joined at their tips.

GB12061 is an early attempt at paired aerofoil but basically describes a biplane. The wings are full size and overlap one another. In addition there is a totally separate tailplane for pitch control.

FR1397402 shows an aircraft with paired wings which is basically a biplane form. The trailing edge of the front wing tip is not adjacent to the leading edge of the rear wing tip and there is a horizontal gap between the two wing tips. At the wing tip there is, in addition, a vertical gap. The airplane clearly requires separate pitch control surfaces and this is by the fore plane as shown for example in FIGS. 1 and 2.

EP88696 shows an aircraft with paired aerofoils. In plan view the tips of the wings overlap each other and are coincidental. In general the front aerofoil is lower than the rear aerofoil.

U.S. Pat. No. 4,146,199 shows an aircraft wing in which the front wing is lower than the rear wing. The tips of the wings do not meet on the same plan. There is an overlap of the wings in the plan view.

U.S. Pat. No. 4,635,773 again shows an aircraft with paired aerofoils in which the front wing is lower than the rear. In this arrangement tip stall can occur when the aircraft flys too slowly. The tips of the wings are not coincidental and in general the rear wing is supported by a fin on the rear of the fuselage.

U.S. Pat. No. 4,053,125 shows an arrangement where the wings of the aicraft overlap each other and there is a substantial gap between the 2 wings. The aircraft requires a large horizantal tail service necessary for stability and control.

GB1518610 shows an aircraft with paired aerofoils. However there is a gap between the tips of the wings see FIGS. 2 and 4. In addition the leading and trailing edges of the wings are coincidental in the plan view. FIG. 4 shows that a large tail plane is necessary for pitch control.

The paired aerofoil of the present invention is intended to overcome the problems as shown in the prior art.

According to the present location there is provided an aircraft having at least one set of paired aerofoils in the form of a forward pair of wings and a rearward pair of wings, the wings extending from a fuselage to wing tips, the wing tips being joined at their tips in the same plane one behind the other, the trailing edge of the forward wings and the leading edges of the rearward wings being substantially coincidental in plan view at the wing tip, the rearward wing being cranked i.e. has a change of dihedral angle between the root and the tip, the minimum angle between the wings in the front view being 4 degrees at the tips of the wings, a substantial part of the forward wings being higher than the rearward wings.

The wing tips are joined in the same plane one behind the other. The wing tips may be joined by a boom or fairing in the same plane. This may be a horizontal plane or a vertical plane or any intermediate plane.

The wings may be jointly or singly swept forward, swept back or straight dependant on the resultant centre of gravity of the aircraft required.

The wing arrangement is particularly suitable for all types of aircraft and provdies an aircraft of high manouvrability capable of flying at low speeds and in certain configurations no stall as such.

The wings provide a diamond shape intersected by the fuselage of the aircraft which produces a structurally rigid wing surface.

It is a preferred feature of the present invention that the root chord of the wing is twice the chord at the tip of the wing. As a result each wing is tapered in plan view.

Other aerofoils may be provided on the aircraft as desired. However they are not generally necessary.

The present invention will be further described, by way of example only, with reference to the accompanying drawings, in which.

Figure 1:
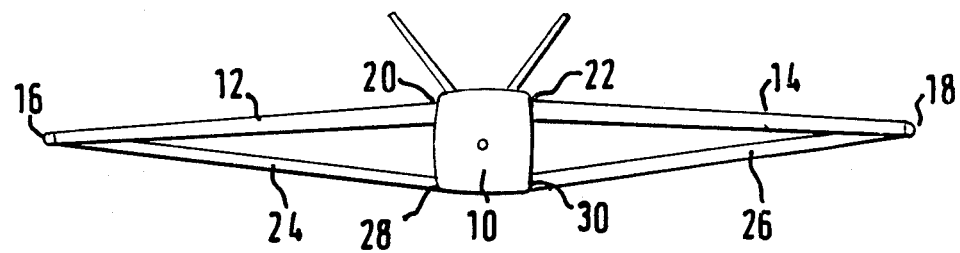
FIG. 1 shows a front view of the aircraft of the present invention.

FIG. 1 is a forward view of the aircraft of the present invention. The aircraft has a fuselage 10 forward pair of wings 12 and 14. The forward wings are swept rearwardly and have anhedral i.e. the tips of the wings 16 and 18 are lower than the wing roots 20 and 22. The rear wings 24 and 26 are forwardly swept and have dihedral. This is clearly shown in the prospective view of the aircraft of the present invention shown in FIG. 2.

The two pairs of wings 12 14 and 24 26 join at the wing tips 16 and 18.

Figure 2:
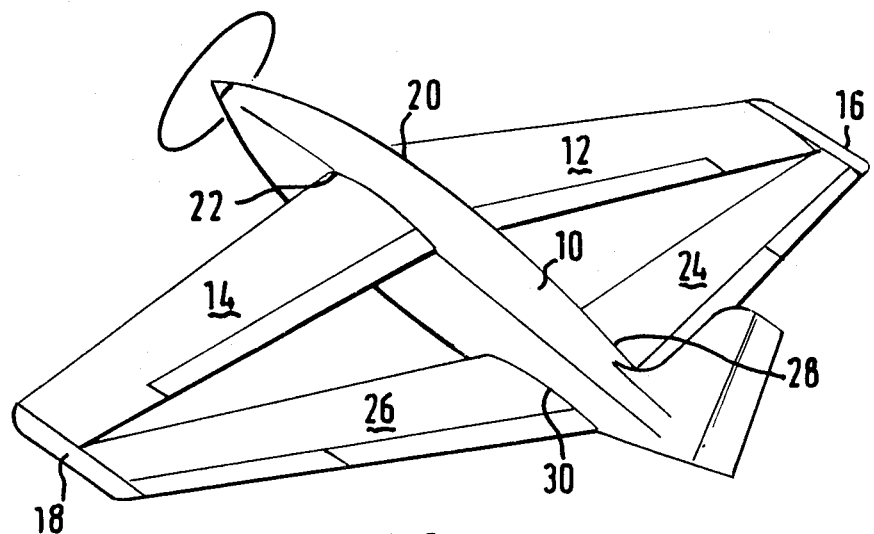
FIG. 2 shows a perspective view of the present invention.
Figure 3:
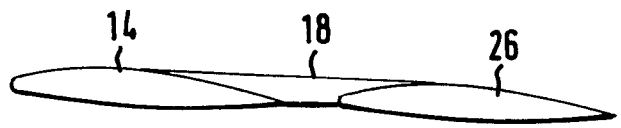
FIG. 3 shows a side view at the wing tips.

FIG. 3 shows a side view at the wing tips 18. The forward wing 14 and the rearward wing 26 meet at the wing tip 18. The wing tips are in the same plane. The tips may be joined by means of a boom or a fairing fin in a horizontal plane as shown in FIG. 2 or a fairing fin in a vertical plane as shown in FIG. 3.

Figure 4A:
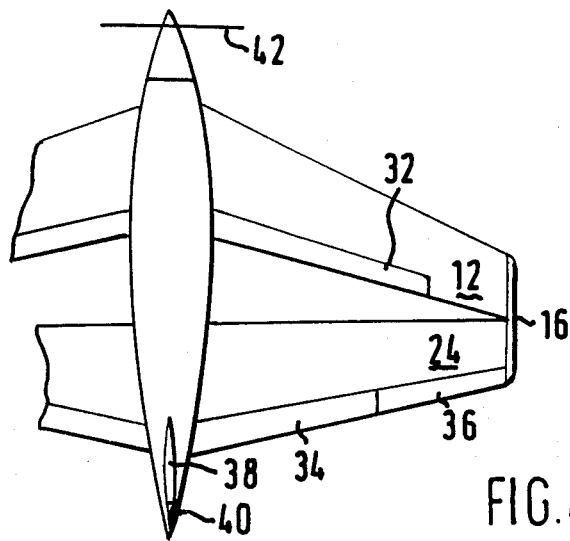
FIGS. 4A to 4C show alternative plan views of the present invention.
Figure 4B:
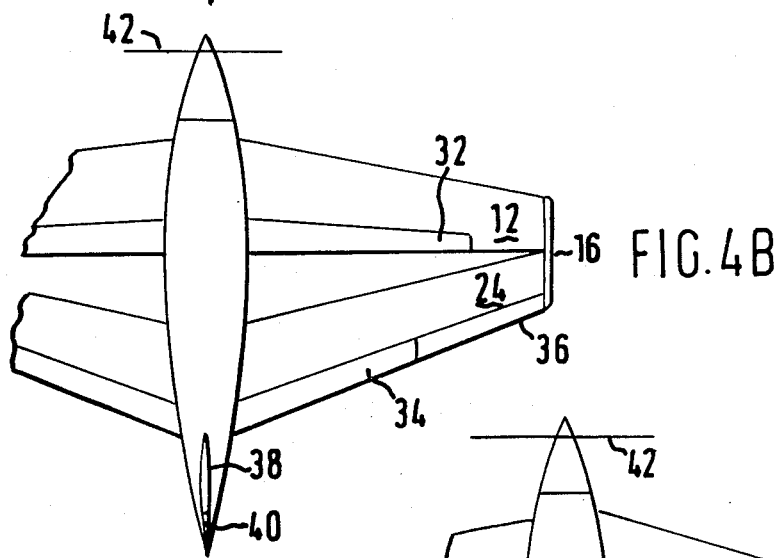
Figure 4C:
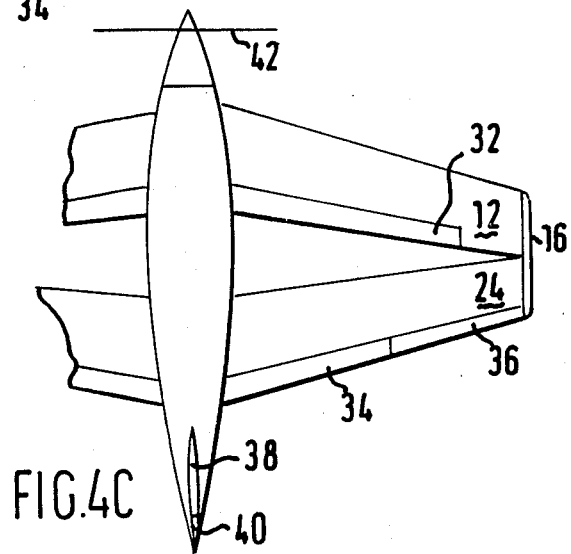

Turning to FIGS. 4A to 4C, this shows an alternative plan view of an arrangement of the present invention showing the forward wings 12 having flaps 32 and the rear wings 24 having elevators 34 and ailerons 36 to provide the various moveable surfaces to control pitch and roll as well as combining flap and spoiler functions, as on a conventional aircraft. Further control may also be provided by a single centrally mounted fin 38 having a rudder 40 at the tail section. Alternatively twin fins and rudders in a V formation may be provided. The V formation may have an angle between the fins in the range 35 degrees to 55 degrees. Alternatively fins and rudders may be mounted directly on to the rear wings anywhere as far out as the wing tips 16 and 18. Its hingeless control and surfaces and flaps may be used by constructing the wings of kevlar/epoxy laminates. Drag maybe reduced because of the lack of leakage of air from high to low pressure areas and boundary layer separation is delayed. Higher efficiency results, as well as reduction in weight and complexity.

FIG. 4A shows a rearwardly swept forward wing and a perpendicular leading edge to the rearward wing.

FIG. 4B shows forwardly swept rear wing and a perpendicular trailing edge of the forward wing. FIG. 4C shows a rearwardly swept forward wing and a forwardly swept rear wing.

In FIGS. 4A to 4C the propulsion means as shown which is a forwardly mounted propeller 42 driven by a conventional engine such as a piston engine or a gas turbine engine. The propeller 42 causes airflow over the paired aerofoils.

Figure 5:
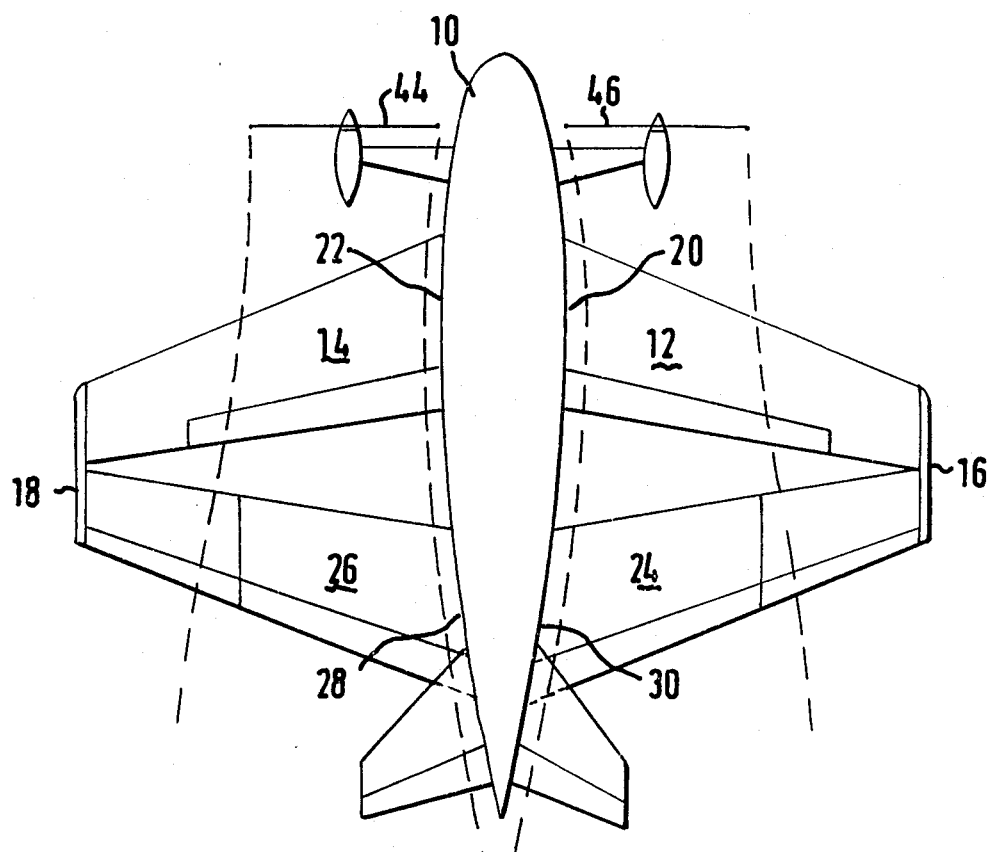
FIG. 5 shows an alternative plan view of the present invention.

FIG. 5 shows an alternative plan view of the present invention which includes twin forwardly mounted propellers 44 and 46 driven by one or more engines. The propellers 44 and 46 preferably rotate in opposite directions. As indicated they may be mounted ahead of the wings so that the slipstream passes over a large proportion of the surfaces of the aerofoils, the slipstream being shown by the hatched lines in FIG. 5. The flap surfaces when they are deployed can generate sufficient lift to allow hovering or vertical take off and landing dependant upon the power utilised and the proportion of wing surface swept by propeller slipstream.

Various other wing arrangements are shown as examples only in FIGS. 6A to 6D, which are all front views of the aircraft of the present invention. Other arrangements will be apparent.

Figure 6A:
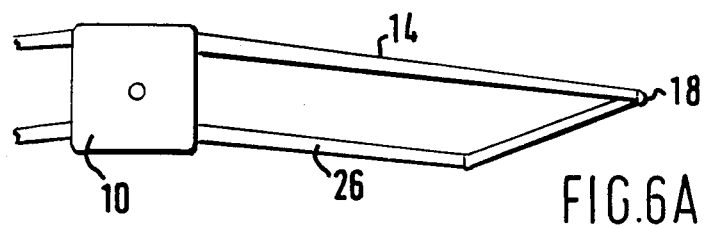
FIGS. 6A to 6D show alternative arrangements of the paired aerofoils in front view.

In FIG. 6A the paired aerofoils are shown. The forward wing has anhedral as does the substantial part of the rearward wing, the wings being parallel in forward view. The rearward wing is cranked and has adhedral.

Figure 6B:
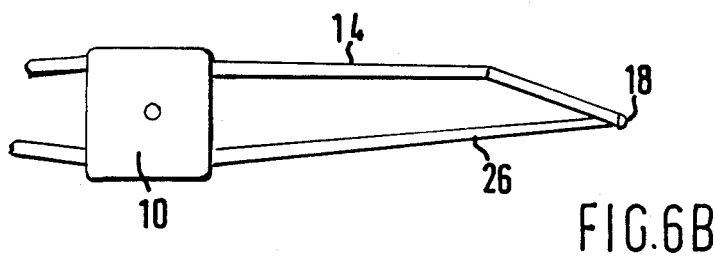

In FIG. 6B the forward wing has neither anhedral or dihedral for a substantial part but has anhedral towards its tips. The rearward wing has dihedral.

Figure 6C:
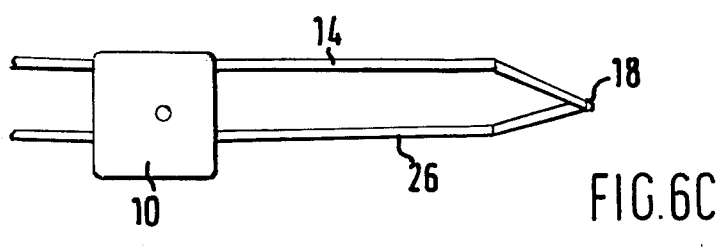
Figure 6D:
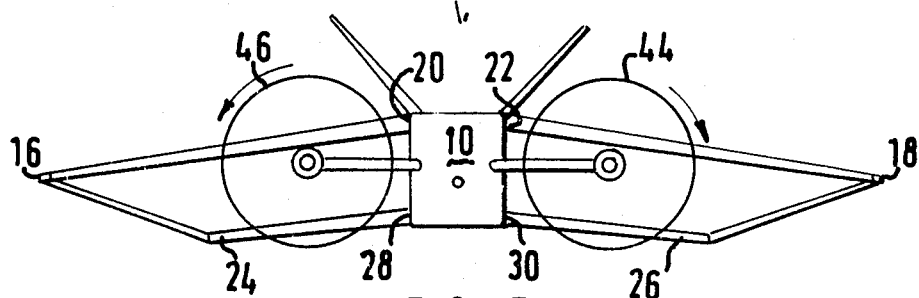

FIG. 6C shows the forward and rearward wings in parallel relationship with neither anhedral or dihedral over a substantial part of the wing, the forward wing towards its tips having anhedral whereas the rearward wing at its tip having dihedral, FIG. 6D shows a similiar arrangement of FIG. 6A where in a substantial part of the wings are parallel and have anhedral although the rearward wing has a crank with a part having dihedral. FIG. 6D substantially is a forward view of the arrangement shown in FIG. 5 having two full propellers 44 and 46.

The minimum angle between the rear wing and the forward wing where they meet at the tips is preferably 4 degrees and more preferably 15 degrees.

In all the arrangements in the figures, it is preferred that the wings have a root chord which is twice that of the chord of the tip of the wing. Thus each wing is tapered in plan view.

The arrangement of the present invention provides an aircraft having a configuration which allows the aircraft to be lighter, stronger, smaller in all dimensions than present aircraft. The basic structural form is inherently stronger than a conventinal configuration since each wing acts as a strut to the other. This makes the aircraft more manoeuvrable, safer, and requires less space for take off and landing areas. In certain configurations described herein, particularly those described in FIGS. 5 and 6D, vertical take off and landing can be achieved.

The wing area of the present invention is distributed over two tandem wings joined at the tips. As a result the wing span is significantly smaller than for a conventional aircraft of the same area. The area being spread over tandem wings results in reduced wing span; this assists in reduction of the weight of the structure necessary to resist lift, drag and horizontal landings. Compared with a conventional aircraft, there is no necessity for a separate tailplane or fore plane for pitch and stability control. Therefore the fuselage is smaller, lighter and has less drag than a conventional aircraft.

The arrangement of the wing tips 16 and 18 enables reduction in wing tip vortex and therefore reduces the drag of the aircraft. As a result utilising a particular power unit the aircraft can achieve a higher speed. The effect of having paired aerofoils and the joined tip configuration described is to reduce stalling, including tip stalling effects of the wing tips even at very low forward speeds, thus manouvrability and flight safety are enhanced in the aircraft of the present invention.

In addition the relationship between the two wings on each side of the fuselage is such that at the tips, the flow at higher angles of attack is similiar to that through a leading edge slot, a slotted flap or other similiar high-lift, stall, delaying devices. In this case the whole aircraft constitutes the slot. As a result, the configuration attains very slow minimum flight speeds, especially when both wings have flaps which causes the size of the chamber between the wings to change.

In the case of tractor mounted engines as shown for example in FIGS. 5 and 6D, the slip stream effect reduces the minimum flight speed possible. This is very effective if twin [opposite handed]propellers are used when up to 85% of the wing surface area can be subject to slip stream effect, as shown by the hatched lines in FIG. 5. In normal level flight higher speeds [or longer range] on the same power can be attained. Air flow around the tip areas is such that there is a large reduction in the usual wing tip vortex and a reduction in the consequently induced drag.

The optimum configuration of the aircraft will vary according to the speed, range, wing-loading and other specific requirements of the aircraft. In general the aircraft will be lighter, smaller and more economical than convential configurations as well as being extremely stable and manoeuvrable even at low speeds. Although the aircraft is capable of short take offs and landings and steep climbs and decent angles, quite large variations of centre of gravity can be tolerated. As a result these flight characteristics as well as the smaller physical size of the aircraft are as attractive for a remote piloted vehicle [RPV] as they are for manned aircraft, the stability being particularly important.

The configuration which give strength and high-lift characteristics make it possible to achieve very good empty or loaded ratios. In general the aircraft may be built of conventional materials such as metal, aluminum etc., GRP, as well as more sophisticated materials which are light and strong. It is possible for the aircraft to lift three times its empty weight without significant degradation of its flight characteristics. As an example, an aircraft with a wing span of 2.3 meters and a length of 2.45 meters with a wing area of 1.86 square meters weighs 10 kilograms empty and can fly safely at an all up weight of 41 kilograms.

The stability and controlability is such that safe flight is possible with fin/rudder surfaces missing or with flaps lowered only on one side. In the first case turning ability is considerably reduced and in the second case the minimum flight speed is naturally increased.

Cross synchronization of controls allows aircraft to skid sideways whilst remaining level across its span. This is a useful ability in restricted or cross wind situations. However in view of the normal functions of the present invention, the additional complexity of the cross synchronization of the controls would only be applied for specific roles, such as shipboard landings in poor conditions.

We claim:

1. An aircraft having at least one set of paired aerofoils in the form of a forward pair of wings and a rearward pair of wings, the wings extending from a fuselage to wing tips, the wing tips being joined in the same plane one behind the other, the trailing edge of the forward wing and the leading edge of the rearward wing being substantially coincidental at the wing tips in plan view, at least one wing being cranked, the minimum angle between the wings in the front view being 4 degrees at the tips of the wings, a substantial part of the forward wings being higher than the rearward wings at the tip section.

2. An aircraft as claimed in claim 1 wherein the wing tips are joined in the same horizontal plane.

3. An aircraft as claimed in claim 1 wherein the wing tips are joined in the same vertical plane.

4. An aircraft as claimed in any one of the proceding claims wherein the forward wing and the rearward wing are substantially parallel for a greater part of their surface, the rearward wing being cranked and having dihedral towards its wing tip.

5. An aircraft as claimed in any one of claims 1 to 3 wherein the forward wing is horizontal over a substantial part of its surface, the rearward wing has dihedral and the forward wing has an anhedraled tip joining the rear wing.

6. An aircraft as claimed in anyone of claims 1 to 3 wherein the rearward wing and the forward wing are substantially parallel for a greater part of their surface, the wing tips of the forward wing being anhedral and the wing tips of the rearward wing being dihedral.

7. An aircraft as claimed in claim 1 wherein the forward wings are swept back and the rearward wings are swept forward.

8. An aircraft as claimed in claim 1 wherein the root chord of wings is twice the chord at the tip of the wings.

9. An aircraft as claimed in claim 1 including control surfaces.

* * * * *